June 22, 1943.  R. E. MARQUARDT ET AL  2,322,462

CHECK VALVE

Filed Aug. 15, 1941

R. E. Marquardt,
H. R. Auspach and
C. A. Croteau

INVENTORS

BY Elwin M. Hulse

ATTORNEY.

Patented June 22, 1943

2,322,462

UNITED STATES PATENT OFFICE 2,322,462

CHECK VALVE

Ronald E. Marquardt, Monroeville, and Harry R. Anspach and Clarence A. Croteau, Fort Wayne, Ind.

Application August 15, 1941, Serial No. 407,023

1 Claim. (Cl. 284—18)

The invention relates to improvements in check valves and it is particularly directed to such valves which are employed in connection with air operated tools, machines and apparatus.

In using air hammers for example, when it is desired to disconnect the air supply hose or tube from the hammer, the general practice has been to first shut off the valve in the supply hose. This valve may be at a remote point so that time is lost in travelling to and from the valve. If the tool is disconnected from the hose without shutting the main control valve, the workman is liable to injury by the whipping of the hose and air is wasted.

The object of our invention is to provide novel means for automatically cutting off the escape of air from the hose at the moment the hose is disconnected from the tool or machine and thereby avoid operation of the main control valve in the air supply and the possibility of injury to the workman. Other objects and advantages will appear hereinafter.

The invention is illustrated in the accompanying drawing in which

Figure 1:
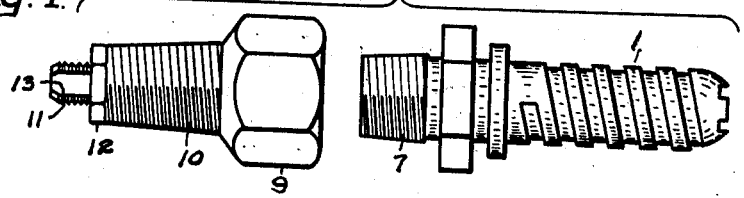
Figure 1 is a side view of the parts comprising the invention detached one from the other.
Figure 2:
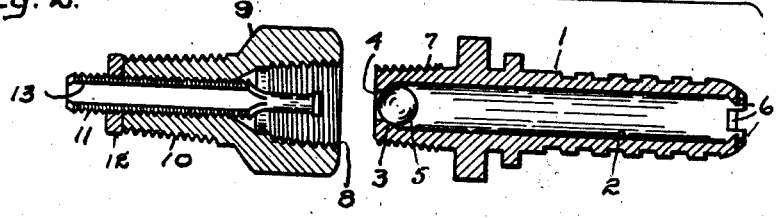
Fig. 2 is a longitudinal cross section of the said parts.

Referring to the illustrative drawing one of the parts 1 of the valve is formed at one end to receive an air supply hose or tube. This part is hollowed to form a channel 2, a seat 3 being formed adjacent to the discharge port 4 at the forward end of the part upon which a ball 5 may contact to close the channel. The material of the part 1 at the opposite or rear end of the channel 2 is notched to provide tongues 6 which are bent inwardly to prevent the escape of the ball 5 at said end of the part.

Figures 3, 4:
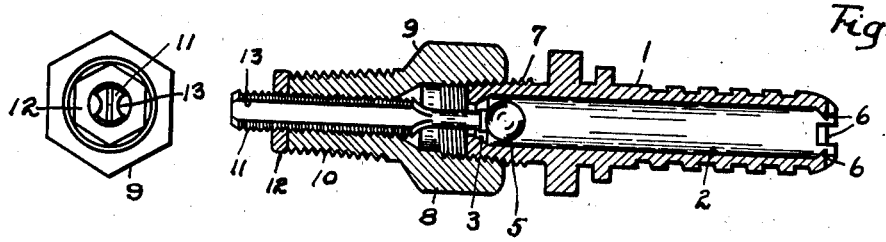
Fig. 3 is a longitudinal cross section of said parts coupled together.
Fig. 4 is an end view of the valve.

The forward end of the part 1 is externally threaded at 7 to receive the internally threaded forward end 8 of the part 9. The part 9 is externally threaded at 10 for connection with the intake of the pneumatic tool or machine. An externally threaded stem or stud 11 is longitudinally adjustably mounted in the rear portion of the part 9 and projects through the rear or outer end thereof for ready access. A nut 12 on the stem serves to lock the stem to the part 9 in its adjusted position. Longitudinal grooves 13 are formed in the stem 11 to provide channels or ducts for the passage of air. The stem 11 is adjusted so that its inner end projects a selected distance into the coupling portion 8, and will contact and unseat the ball 5 when the parts 1 and 9 are coupled together, as shown in Fig. 3. The part 1 remains in the hose and the part 9 may remain installed in the tool or machine. As the two parts are uncoupled and the stem disengages the ball 5 the air under pressure in the hose instantly seats the ball and the escape of the air from the hose is prevented.

The cooperating threads on the two parts are of such number that only a portion of them are required to couple the parts together. In case the latter threads wear others of the remaining threads are available, the stem being adjusted to unseat the ball 5 the desired amount, thereby prolonging the life of the coupling.

In use the valve operating stem 11 will be adjusted to unseat the ball 5 the selected amount when the threaded end 7 of the part 1 has reached a selected depth in the portion 8 of the part 9. The ball remains unseated as long as the two parts are coupled so that air under pressure is available at the tool. Upon disconnection of the two parts for any purpose the valve 5 instantly seats and it is unnecessary to close the valve in the main supply. Changes in tools for operation by the air supply may be made rapidly without danger of injury to the workman.

What we claim is:

A check valve for pneumatically operated devices comprising two fluid conducting members one of which is internally threaded at one end, and adapted to be connected to the device, and the other of which is externally threaded at one end and adapted to be connected to a source of fluid supply under pressure, the externally threaded portion of the latter member being adapted to be adjustably engaged by the internal threads on the other member for coupling said members together, a seat within the externally threaded member adjacent to its discharge end, a ball within said member adapted to engage said seat, means at the opposite end of said member to prevent escape of the ball therefrom and a longitudinally grooved stem adjustably threaded through the discharge end of the internally threaded member and adapted to engage and unseat the ball said stem projecting from the outer end of the latter member for ready adjustment and the grooves therein forming fluid communications between the discharge ends of the two members.

RONALD E. MARQUARDT.
HARRY R. ANSPACH.
CLARENCE A. CROTEAU.